US010612955B2

(12) United States Patent
Akagi et al.

(10) Patent No.: US 10,612,955 B2
(45) Date of Patent: Apr. 7, 2020

(54) FLOW MEASURING DEVICE HAVING PLURALITY OF BENDING PORTIONS

(71) Applicant: Mitsubishi Electric Corporation, Tokyo (JP)

(72) Inventors: Kazuto Akagi, Tokyo (JP); Naoyuki Kishikawa, Tokyo (JP); Masahiro Kawai, Tokyo (JP); Yuji Ariyoshi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 70 days.

(21) Appl. No.: 15/478,486

(22) Filed: Apr. 4, 2017

(65) Prior Publication Data

US 2018/0113015 A1   Apr. 26, 2018

(30) Foreign Application Priority Data

Oct. 25, 2016   (JP) ................................. 2016-208357

(51) Int. Cl.
*G01F 5/00* (2006.01)
*G01F 1/64* (2006.01)
(Continued)

(52) U.S. Cl.
CPC ......... *G01F 5/00* (2013.01); *F02M 35/10386* (2013.01); *G01F 1/64* (2013.01);
(Continued)

(58) Field of Classification Search
CPC .................................................... G01F 1/6842
(Continued)

(56) References Cited

U.S. PATENT DOCUMENTS 5,563,340 A * 10/1996 Clowater .............. G01F 1/6842
73/114.34
5,804,718 A * 9/1998 Nagasaka ............. G01F 1/6842
73/114.34
(Continued)

FOREIGN PATENT DOCUMENTS

JP   2007183212 A   7/2007
JP   2008309614 A   12/2008
(Continued)

OTHER PUBLICATIONS

Communication dated Jun. 20, 2017, from the Japanese Patent Office in counterpart Japanese application No. 2016-208357.

*Primary Examiner* — Harshad R Patel
*Assistant Examiner* — Tran M. Tran
(74) *Attorney, Agent, or Firm* — Sughrue Mion, PLLC; Richard C. Turner

(57) ABSTRACT

A flow measuring device includes a sub-bypass passage arranged to precede a bypass passage which is linked to a flow detecting element. Bypass passage wall surfaces, which are positioned adjacent the sub-bypass passage, are inclined toward a direction of a sub-inflow opening, and an inner-circumference-side wall surface and an outer-circumference-side wall surface of the sub-bypass passage are inclined toward a direction of a sub-outflow opening. The described structure minimizes variations in the size of the bypass passage due to build-up of foreign material, and results in a more stable flow velocity of measured fluid past the flow detecting element.

5 Claims, 6 Drawing Sheets

(51) Int. Cl.
*G01F 1/684* (2006.01)
*F02M 35/10* (2006.01)
*G01F 15/18* (2006.01)

(52) U.S. Cl.
CPC .......... *G01F 1/6842* (2013.01); *G01F 1/6845* (2013.01); *G01F 15/185* (2013.01)

(58) Field of Classification Search
USPC .......................................... 73/204.15–204.26
See application file for complete search history.

(56) References Cited

U.S. PATENT DOCUMENTS

| | | | | |
|---|---|---|---|---|
| 6,332,356 B1 * | 12/2001 | Hecht | .................. | G01F 1/6842 73/202.5 |
| 6,336,360 B1 * | 1/2002 | Weber | .................. | G01F 1/6842 73/204.21 |
| 6,345,531 B1 * | 2/2002 | Mueller | ................ | G01F 1/6842 73/204.22 |
| 6,851,309 B2 * | 2/2005 | Lenzing | ............... | F02M 35/021 73/204.22 |
| 6,915,682 B2 * | 7/2005 | Renninger | ........... | G01F 1/6842 73/114.34 |
| 6,973,823 B2 * | 12/2005 | Lenzing | ............... | F02M 35/021 73/114.32 |
| 7,047,805 B2 * | 5/2006 | Zurek | .................. | G01F 1/6842 73/202.5 |
| 7,089,788 B2 * | 8/2006 | Yonezawa | ............ | G01F 1/6842 73/114.32 |
| 7,124,626 B2 * | 10/2006 | Lenzing | ............... | G01F 1/6842 73/114.32 |
| 7,162,920 B2 * | 1/2007 | Konzelmann | ........... | F02D 41/18 73/202.5 |
| 7,260,986 B2 * | 8/2007 | Lenzing | ................ | G01F 1/6842 73/202.5 |
| 7,360,414 B2 * | 4/2008 | Konzelmann | ......... | G01F 1/6842 73/202.5 |
| 7,401,509 B2 * | 7/2008 | Konzelmann | ......... | G01F 1/6842 73/202.5 |
| 7,467,546 B2 * | 12/2008 | Igarashi | ................ | G01F 1/6842 73/202.5 |
| 7,559,237 B2 * | 7/2009 | Kikawa | ................. | G01F 1/6842 73/202.5 |
| 7,654,134 B2 * | 2/2010 | Enomoto | .............. | G01F 1/6842 73/114.32 |
| 7,752,908 B2 * | 7/2010 | Igarashi | ................ | G01F 1/6842 73/204.22 |
| 7,942,052 B2 * | 5/2011 | Ariyoshi | ................... | G01F 1/72 73/202.5 |
| 7,942,053 B2 * | 5/2011 | Saito | ..................... | G01F 1/6845 73/204.21 |
| 7,946,158 B2 * | 5/2011 | Enomoto | .............. | G01F 1/6842 73/114.32 |
| RE42,529 E * | 7/2011 | Watanabe | ............ | G01F 1/6842 73/202.5 |
| 8,191,417 B2 * | 6/2012 | Ariyoshi | ................... | G01F 1/72 73/202.5 |
| 8,695,409 B2 * | 4/2014 | Kohno | ................... | G01F 1/6842 73/114.32 |
| 8,733,159 B2 * | 5/2014 | Tsujii | .................... | G01F 1/6842 73/114.32 |
| 8,739,619 B2 * | 6/2014 | Ooga | ................... | G01K 13/02 73/202.5 |
| 8,752,424 B2 * | 6/2014 | Ban | ....................... | G01F 1/6842 73/202 |
| 8,844,342 B2 * | 9/2014 | Kitahara | ............... | G01M 15/04 73/114.34 |
| 8,899,103 B2 * | 12/2014 | Ariyoshi | ................. | G01F 5/00 73/114.34 |
| 8,978,455 B2 * | 3/2015 | Mais | ....................... | F02D 41/18 73/114.32 |
| 9,217,655 B2 * | 12/2015 | Briese | ..................... | G01F 1/684 |
| 9,234,817 B2 * | 1/2016 | Kishikawa | ................ | G01F 9/00 |
| 9,506,794 B2 * | 11/2016 | Akagi | ..................... | G01F 1/6842 |
| 9,689,358 B2 * | 6/2017 | Sudou | .............. | F02M 35/10386 |
| 9,709,428 B2 * | 7/2017 | Morino | ................. | G01F 1/6842 |
| 9,759,593 B2 * | 9/2017 | Goka | ....................... | G01F 5/00 |
| 10,018,492 B2 * | 7/2018 | Morino | .................... | G01F 1/692 |
| 2010/0095753 A1 | 4/2010 | Enomoto et al. | | |
| 2013/0019675 A1 | 1/2013 | Ban | | |
| 2016/0116314 A1 | 4/2016 | Akagi et al. | | |
| 2016/0313165 A1 * | 10/2016 | Sudou | ....................... | G01F 5/00 |
| 2018/0113015 A1 * | 4/2018 | Akagi | ............. | F02M 35/10386 |

FOREIGN PATENT DOCUMENTS

| | | |
|---|---|---|
| JP | 5408195 B2 | 2/2014 |
| JP | 5826360 B1 | 12/2015 |

* cited by examiner

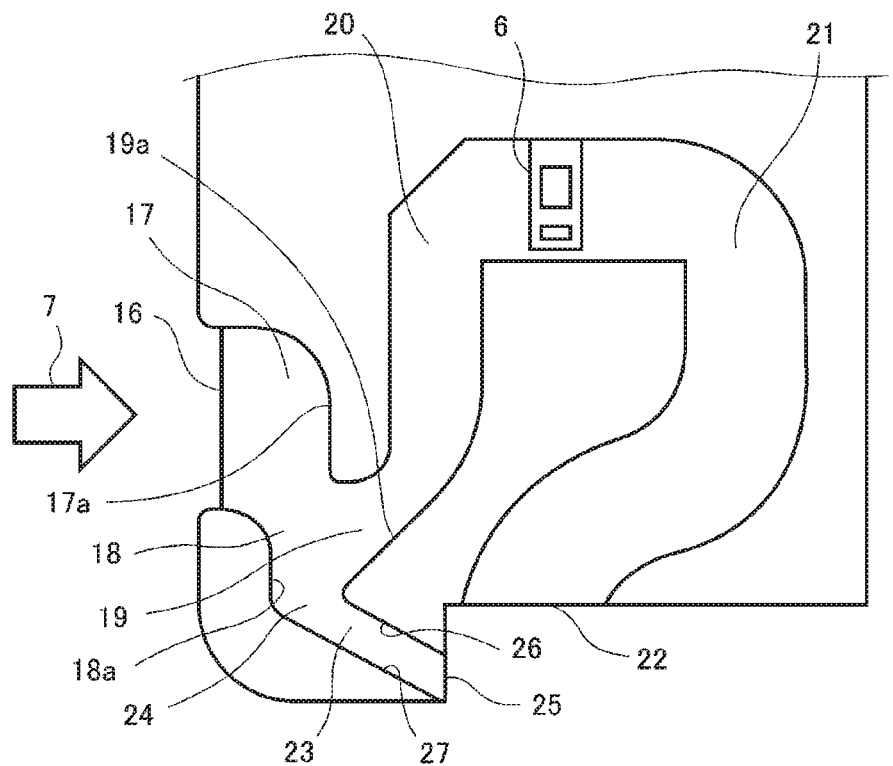

FLOW MEASURING DEVICE HAVING PLURALITY OF BENDING PORTIONS

BACKGROUND OF THE INVENTION

Field of the Invention

The present invention relates to a flow measuring device, and relates to a device which measures an air mass flow of, for example, an internal combustion engine.

Background Art

As a thermal-type flow measuring device which is mounted in an intake air pipeline of an internal combustion engine and measures a flow of inhalation air, there is a known a flow measuring device in which a flow detecting element is arranged in a measuring passage (hereinafter, refer to a bypass passage) by which a part of the inhalation air is inputted. A semiconductor element, in which a flow detecting portion is configured by using a few-micron thin film, is used for the flow detecting element.

There is a case in which inhalation air and dust are mixed and inputted into the intake air pipeline in accordance with a usage environment of the above-described flow measuring device, and the dust invades in the bypass passage.

When the inhalation air and the dust, of which particle diameter is roughly 100 μm through 200 μm, invade in the bypass passage and are smashed with a high speed to a flow detecting portion, the flow detecting element is configured by using a thin film, so that it is reported that a failure is caused, and the flow measuring device is broken down.

In order to the above-described problem, a bending shape and a branching shape are generally adopted for a shape of a bypass passage which is positioned at an upper stream of the flow detecting element, and an impact energy reduction capability for the dust and an ejection capability for the dust, which is ejected from the inside of the bypass passage, are improved.

For example, the following configurations are adduced in Patent Document 1 and Patent Document 2.

In a flow measuring device which is described in Patent Document 1, a bypass wall surface is disposed in such a way that a pathway, by which an inflow opening and a flow detecting element are linearly connected, is blocked, and a bypass passage, which is positioned at an upper stream of the flow detecting element, is roughly vertically bent at multiple times, and the flow detecting element is arranged at an lower stream of the bypass passage.

The above described configuration is adopted, whereby dust can be smashed to a bypass passage wall surface at multiple times, and impact energy of the dust with respect to the flow detecting element is reduced, and a failure of the flow detecting element is prevented.

Moreover, at a bypass passage which is indicated in Embodiment 4 described in Patent Document 1, a sub-bypass passage, which is linked to a main stream, is disposed at a different position of a main bypass passage which is linked to a detecting element.

The sub-bypass passage is disposed at an outer circumference side of a bending portion, so that a centrifugal effect is used, and the dust can be ejected, at the bypass passage which is positioned in front of the flow detecting element, to the outside of the bypass passage.

Moreover, in a flow measuring device which is described in Patent Document 2, a bypass passage is linearly configured, and a sub-bypass passage, which is branched at a middle position of the bypass passage so as to be provided and inputs a part of a measurement fluid which is flowed in the bypass passage which is linearly configured, is included, and a flow detecting element is arranged on the sub-bypass passage.

The sub-bypass passage is roughly vertically disposed with respect to the bypass passage, and dust in the measurement fluid, which is passed through the bypass passage, is linearly flowed by an inertial force, so that an invasion capability of the dust, which is flowed to the sub-bypass passage, can be reduced, and it can be prevented that the dust is reached to the flow detecting element.

[Patent Document 1]
Japanese Patent Publication No. 5826360
[Patent Document 2]
Japanese Patent Publication No. 5408195

In the conventional flow measuring devices which are indicated in Patent Document 1 and Patent Document 2, in order to prevent a failure of a flow detecting element, which is caused in accordance with dust which is mixed and inputted to inhalation air, various configurations are suggested from a viewpoint of an impact energy reduction capability for the dust and an ejection capability for the dust, and a tolerance with respect to the dust is improved.

However, a shape of a bypass passage of the flow measuring device, which is conventionally suggested, has not a configuration in which a foreign material is sufficiently ejected when a water droplet and a foreign material having a high viscosity (hereinafter, those are integrally described as a foreign material) invade in the bypass passage, and there is a problem in that an output variation is caused in accordance with a stack of the foreign material. In the following descriptions, a cause by which the foreign material invades in the bypass passage, and a mechanism by which the output variation is caused, and problems of Patent Document 1 and Patent Document 2 are described.

In a flow measuring device which is used in an internal combustion engine, there is a case in which a foreign material, except for the above-described dust, such as an engine oil, of which viscosity is high, is flying and coming in a main flow passage, and there is a possibility in which inhalation air and the foreign material invade in a bypass passage. Moreover, in an internal combustion engine which is used at, for example, a cold climate area, a temperature in the internal combustion engine is greatly different from a temperature in the outside air when the internal combustion engine is operated, and there is a case in which a water droplet, which is caused in accordance with a condensation, is caused in an intake air pipeline and the bypass passage.

When the above-described foreign material and the water droplet are fixed and frozen in the bypass passage, a flow of a measurement fluid, which is flowed in the bypass passage, is varied, and an output variation is caused, so that it is important that a bypass passage, which has a sufficient ejection capability for the foreign material, is configured.

On the other hand, a shape of a bypass passage of a conventional flow measuring device has not a sufficient ejection capability for a foreign material. For example, when a measurement fluid and a foreign material invade in a flow measuring device which is indicated in Patent Document 1, the foreign material is smashed and adhered to a bypass wall surface, by a centrifugal effect at a bending portion, in a similar way in which the above-described dust is smashed and adhered.

Although the foreign material, which is adhered to the bypass wall surface, is flowed along the bypass passage wall surface while time is elapsed, and is fallen in an insertion direction, a bottom surface of the bypass passage is configured in parallel to the measurement fluid, so that the foreign material is stacked at the bypass passage.

In the flow measuring device which is indicated in Patent Document 2, a bottom surface of a main bypass passage is similarly configured in parallel to a measurement fluid, so that a foreign material is easily stacked at the bottom surface of the bypass passage, and there is a problem in that an output variation is caused in accordance with a stack of the foreign material.

Moreover, although there is a case in which a number of revolutions of an engine is low in a vehicle or the like, and a pulsating flow, which is attended with a back flow, is caused at a condition of a high load, there is a case in which the foreign material is mixed into the back flow when the pulsating flow is caused. In the flow measuring device which is indicated in Patent Document 2, an outlet of the main bypass passage is vertically opened with respect to the back flow, so that it is indicated as a problem that the foreign material, which is flying and coming together with the back flow, easily invades in the bypass passage.

SUMMARY OF THE INVENTION

The present invention has been made to solve the above-described problems, and an object of the invention is to provide a flow measuring device in which a foreign material is ejected to the outside of a bypass passage without stacking the foreign material in the bypass passage, and an output characteristic variation, which is caused in accordance with a shape variation of the bypass passage, is prevented.

A flow measuring device of the present invention includes a first bending portion by which a passage is bent in a direction where the bypass passage, in which a part of a measured fluid, which is circulated in a main passage, is circulated, is separated from a control circuit of a flow detecting element, a second bending portion by which the passage is bent in such a way that the bypass passage, which is bent by the first bending portion, is parallel to a flow direction of a main stream, a third bending portion by which the passage is bent in a direction of the control circuit in such a way that the bypass passage, which is bent by the second bending portion, is vertical with respect to the flow direction of the main stream, a fourth bending portion by which the passage is bent in such a way that the bypass passage, which is bent by the third bending portion, is parallel to the flow direction of the main stream, and a fifth bending portion by which the passage is bent in a direction where the bypass passage is separated from the control circuit in such a way that the bypass passage, which is bent by the fourth bending portion, is vertical with respect to the flow direction of the main stream, and a sub-inflow opening in which a measured fluid, which is passed through the first bending portion, is flowed and inputted, and a sub-outflow opening by which the measured fluid, which is flowed and inputted from the sub-inflow opening, is joined to the main stream, are provided, and a sub-bypass passage, in which a passage between the inflow opening and the outflow opening is inclined toward the main stream, is included.

According to the flow measuring device of the present invention, a bypass passage wall surface, which is positioned at an upper stream of a flow detecting element, is inclined toward a sub-inflow opening portion, whereby a foreign material, which is adhered to the bypass passage wall surface, is flowed along the bypass passage wall surface and is guided to a sub-bypass passage which is linked to a main stream, so that a shape of a bypass passage, which has a sufficient ejection capability for the foreign material, can be formed.

BRIEF DESCRIPTION OF THE DRAWINGS

FIG. 2 is a front view in which adjacent portions of a bypass passage of the flow measuring device according to Embodiment 1 of the present invention are enlarged and indicated;

Hereinafter, suitable embodiments of a flow measuring device of the present invention will be explained in reference to drawings.

In addition, the flow measuring device, which is indicated in the present invention, is used for measuring a flow of a measured fluid which is flowed in an intake air pipeline, and the flow measuring device is used for measuring a flow of air which is flowed in an intake air pipeline of, for example, an internal combustion engine.

EMBODIMENT 1

Figure 1:
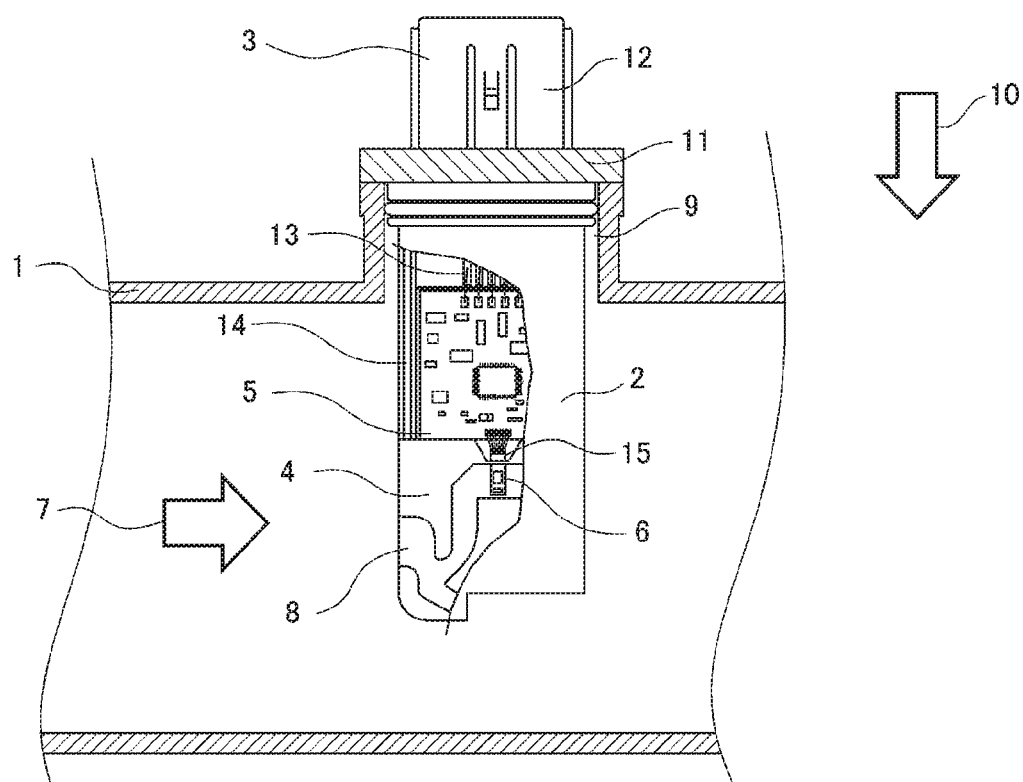
FIG. 1 is a front view in which a part of a flow measuring device according to Embodiment 1 of the present invention is cut out and indicated.

FIG. 1 is a front view in which a part of a flow measuring device according to Embodiment 1 of the present invention is cut out and indicated.

The flow measuring device, which is attached to an intake air pipeline 1 used as a main passage, is composed of a cover 2, a base 3, a plate 4, a circuit board 5 which composes a control circuit, and a flow detecting element 6, and the cover 2 and the plate 4 are attached by an adhesive or the like, whereby a bypass passage 8, which inputs a part of inhalation air 7 which is a measured fluid which is flowed in an arrow direction, is formed. The control circuit, which is composed of the circuit board 5, drives the flow detecting element 6, and the control circuit processes a signal of the flow detecting element 6.

For example, a PBT resin is used for a material of the cover 2, the base, and the plate 4.

A through hole 9, by which the flow measuring device is attached, is provided at the intake air pipeline 1, and the flow measuring device is inserted from the outside of the intake air pipeline 1 to a direction which is indicated by an arrow 10, and a flange 11 of the base 3 is fixed by a screw (not illustrated) or the like, whereby the flow measuring device is attached to the intake air pipeline 1.

A connector 12 of the base 3 is used as a terminal by which a signal is given to and received from the outside, and the other end portion of the connector 12 is electrically connected to the circuit board 5 by using a wire bonding 13.

The circuit board 5 is supported and installed by using a case 14 of the base 3, and the flow detecting element 6 is installed in a groove portion of the plate 4. Moreover, the circuit board 5 and the flow detecting element 6 are electrically connected by using a wire bonding 15.

At the semiconductor-style flow detecting element 6, a thin portion is formed in such a way that an etching is performed at a back surface of an insulation plate which is made from silicon, poly-silicon, ceramic or the like, and a flow detecting portion, which is composed of a flow detecting resistor and a temperature compensation resistor, is formed on the thin portion.

At the flow detecting element 6, a heat capacity of a heating resistor is small, and a heat insulation capability with respect to a supporting component is excellent, so that low electric power consumption and a high-speed response are realized.

Although there is a case in which the inhalation air 7 and dust, of which particle diameter is roughly 100 μm through 200 μm, are flying and coming in the intake air pipeline 1, the flow detecting portion, which is formed at the thin portion of the flow detecting element 6, is vulnerable to an impact which is applied from the outside. In particular, when the dust, which is accelerated by the inhalation air 7, is smashed with a high speed to the flow detecting portion of the flow detecting element 6, a failure is caused at the flow detecting resistor and the temperature compensation resistor, and flow detection accuracy is decreased, and moreover, there is a possibility in which a measuring function is lost.

Therefore, a bending portion and a branching portion are adopted for a shape of a bypass passage of a conventional flow measuring device, and an impact energy reduction capability for the dust and an ejection capability for the dust are improved.

Moreover, there is a case in which a foreign material, except for the dust, such as an engine oil which is flying and coming, together with the inhalation air 7, into the intake air pipeline 1, or a water droplet, which is caused in accordance with a condensation, of which viscosity is higher than a viscosity of the dust, invades in the bypass passage 8. The foreign material is easily adhered to a bypass passage wall surface, and there is a possibility in which the foreign material is stacked in the bypass passage 8. When the foreign material is stacked in the bypass passage 8, an orbit of the inhalation air 7 in the bypass passage 8 is varied, and a flow velocity of the inhalation air 7, which is flowed at an adjacent portion of the flow detecting element 6, is varied, whereby there is a case in which an output variation is caused.

On the other hand, in order to improve a tolerance with respect to the dust, a bending shape and a branching shape are adopted for a shape of a bypass passage of a conventional flow measuring device, so that although a foreign material is easily smashed to a bypass passage wall surface in accordance with an inertial effect at the bending portion and the branching portion, and the foreign material is easily adhered to the bypass passage wall surface, the conventional flow measuring device has not a configuration in which the foreign material, which is adhered to the bypass passage wall surface, can be sufficiently ejected.

Therefore, there is a problem in which an output variation is caused when the foreign material, which is adhered to the bypass passage wall surface, is stacked.

In order to solve the above-described problem, the flow measuring device according to Embodiment 1 has a configuration in which a sub-bypass passage, which is linked to a main stream at an upper stream with respect to a position where the flow detecting element 6 is disposed, is disposed, and a bypass passage wall surface, which is adjacent to a sub-bypass passage and a sub-inflow opening, is inclined in a direction of the sub-inflow opening.

Hereinafter, a configuration of the bypass passage 8 will be minutely explained in reference to FIG. 2.

FIG. 2 is a front view in which adjacent portions of a bypass passage of the flow measuring device according to Embodiment 1 of the present invention are enlarged. An inflow opening 16 of the bypass passage is faced to an upper stream side in a flow direction of a main stream of a measured fluid, and the inflow opening 16 is opened toward a surface which is orthogonal to the flow direction of the main stream of the measured fluid in the intake air pipeline 1. The flow measuring device includes a first bending portion 17 by which a passage is bent in a roughly perpendicular direction with respect to the flow direction of the main stream of the measured fluid and in a direction where the first bending portion 17 is separated from a circuit installing portion which is composed of the case 14 of the base 3, in which the circuit board 5 is installed; a second bending portion 18 by which the passage is bent in parallel to the flow direction of the main stream of the measured fluid; a third bending portion 19 by which the passage is bent in a roughly perpendicular direction with respect to the flow direction of the main stream of the measured fluid and in a direction of the circuit installing portion; a fourth bending portion 20 by which the passage is bent in parallel to the flow direction of the main stream of the measured fluid; and a fifth bending portion 21 by which the passage is bent in a roughly perpendicular direction with respect to the flow direction of the main stream of the measured fluid and in a direction where the fifth bending portion 21 is separated from the case 14, in other word a control circuit, of the base 3, in which the circuit board 5 is installed.

An outflow opening 22, which is linked to the main stream of the measured fluid which is flowed in the intake air pipeline 1 used as a main passage, is provided at a following portion of the fifth bending portion 21.

The flow detecting element 6 is disposed at an immediately following portion of the fourth bending portion 20.

At a sub-bypass passage 23 which is provided in non-parallel with respect to the flow direction of the main stream of the measured fluid and is linked to the main stream of the measured fluid, which is different from the outflow opening 22, a sub-inflow opening 24, which is an entrance portion of the sub-bypass passage 23, is provided at a upper stream of the arrangement position of the flow detecting element 6.

The sub-inflow opening 24 is disposed at an end portion from the second bending portion 18 to an outer-circumference-side wall surface 19a of the third bending portion 19, and an outer-circumference-side wall surface 18a of the second bending portion 18 is inclined toward a direction of the sub-inflow opening 24, and an inner-circumference-side wall surface 26 and an outer-circumference-side wall surface 27, which compose the sub-bypass passage 23, are provided in non-parallel with respect to the flow direction of the main stream (flow direction of the inhalation air 7) of the measured fluid, and are inclined toward a direction of a sub-outflow opening 25, in a surface which is formed by an insertion direction, which is indicated by the arrow 10, and the flow direction of the main stream (flow direction of the inhalation air 7) of the measured fluid.

Hereinafter, an effect of the bypass passage 8 according to Embodiment 1 will be explained.

Firstly, an effect and a problem of the flow measuring devices, which are described in Patent Document 1 and Patent Document 2, will be explained as a comparison example.

Figure 3A:
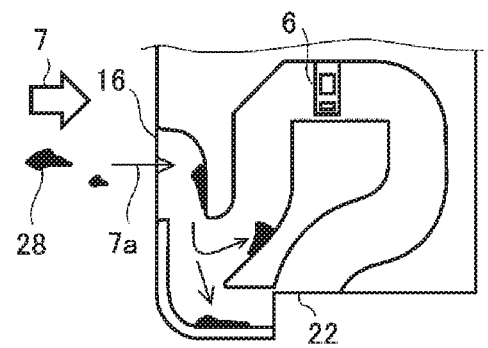
FIG. 3A is views for explaining a behavior of a foreign material which invades in a bypass passage of a flow measuring device described in Patent Document 1.

FIGS. 3A-3D indicate a behavior of a foreign material which invades in a bypass passage of a flow measuring device according to Embodiment 4 which is described in Patent Document 1. Firstly, as indicated in FIG. 3A a foreign material 28 and an inhalation air 7, which invade in the bypass passage, continue a linear motion along a flow direction 7a of the inhalation air 7, so that the foreign material 28 is smashed to an outer-circumference-side wall surface of a first bending portion. Moreover, the foreign material 28 is smashed to an outer-circumference-side wall surface of a second bending portion and an outer-circumference-side wall surface of a third bending portion at the second bending portion and the third bending portion in accordance with a centrifugal action at the bending portions.

In this case, when a viscosity of the foreign material 28 is high, the foreign material 28 is adhered to a bypass passage wall surface, and the foreign material 28 remains in the bypass passage.

Figure 3B:
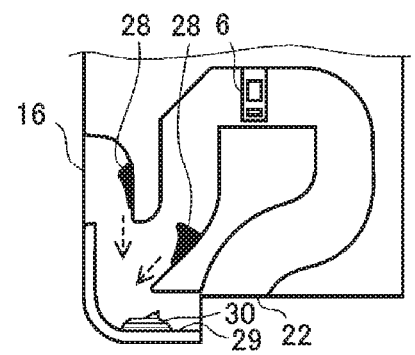
FIG. 3B is views for explaining a behavior of a foreign material which invades in a bypass passage of a flow measuring device described in Patent Document 1.
Figure 3C:
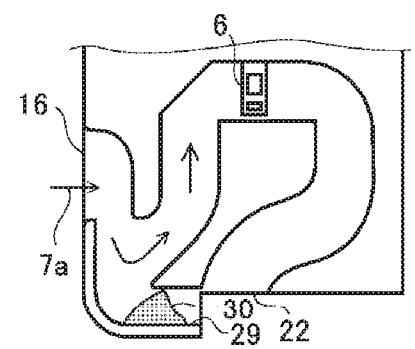
FIG. 3C is views for explaining a behavior of a foreign material which invades in a bypass passage of a flow measuring device described in Patent Document 1.

As indicated in FIG. 3B, although the foreign material 28, which remains in the bypass passage, is flowed along the bypass passage wall surface while time is elapsed, and is naturally fallen in an insertion direction of an arrow 10, a bypass passage bottom surface 29 is configured in parallel to a flow direction of the inhalation air 7, so that the flow measuring device has a configuration in which a foreign material 30 is stacked at the bypass passage bottom surface 29. As a result, as indicated in FIG. 3C, the foreign material 30, which is stacked at the bypass passage bottom surface 29, is grown, and a flow of the inhalation air 7, which is flowed in the bypass passage, is varied, whereby a flow velocity of the inhalation air 7 at an adjacent portion of a flow detecting element 6 is varied, and an output variation is caused.

Figure 3D:
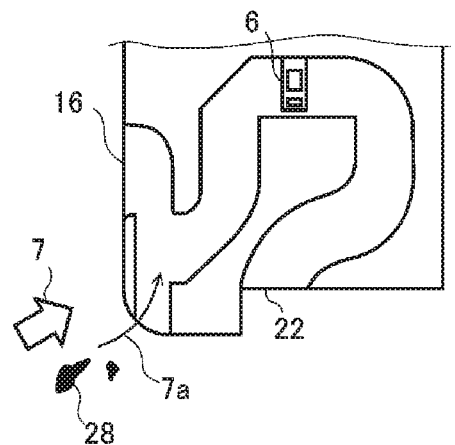
FIG. 3D is views for explaining a behavior of a foreign material which invades in a bypass passage of a flow measuring device described in Patent Document 1.

Moreover, there is a case in which the flow direction 7a of the inhalation air 7, which is flowed in an intake air pipeline 1, is not roughly perpendicular with respect to an inflow opening 16 in accordance with a shape of the intake air pipeline 1, and, for example, as indicated in FIG. 3D, there is a case in which the inhalation air 7 is flowed in an opposite insertion direction. In this case, in the flow measuring device according to Embodiment 3 which is described in Patent Document 1, the inhalation air 7 and the foreign material 28 are flowed and inputted from a sub-outflow opening portion, and the inhalation air 7, which is flowed in the bypass passage, is varied, and there are caused problems in which flow detection accuracy is decreased and the foreign material 28 is stacked in the bypass passage.

Moreover, in a flow measuring device which is described in Patent Document 2, a bypass passage bottom surface is configured in parallel to a measured fluid, so that there is a caused problem in which the above-described foreign material is stacked, and there are caused problems in which a water droplet is remained at the bypass passage bottom surface when the water droplet is caused in a bypass passage in accordance with a condensation, and moreover, a shape of the bypass passage is varied when the water droplet is frozen in accordance with a variation of a temperature of the outside air, and a flow velocity of a inhalation air at an adjacent portion of a flow detecting element 6 is varied, and an output variation is caused.

Moreover, in a flow measuring device which is used in an internal combustion engine, although there is a case in which a pulsing flow including a back flow is caused, a sub-outflow opening portion is vertically opened, with respect to the back flow, in the flow measuring device which is described in Patent Document 2, so that there is a problem in that a foreign material, which is flowing and coming when the back flow is caused, easily invades in a bypass passage, when the foreign material is included in the back flow.

Figure 4A:
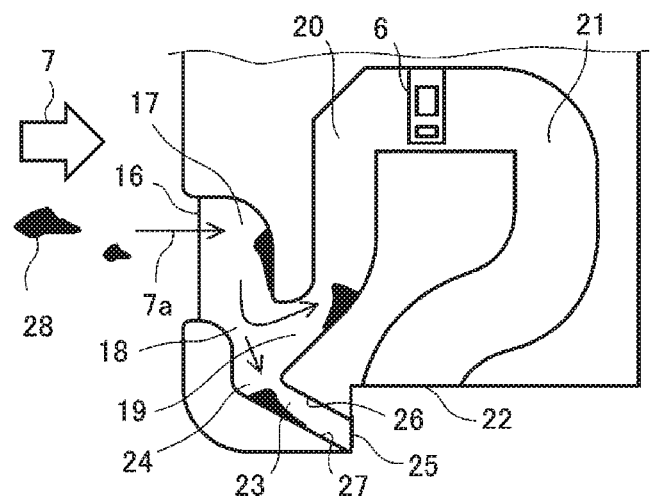
FIG. 4A is views for explaining a behavior of a foreign material which invades in the bypass passage of the flow measuring device according to Embodiment 1 of the present invention.
Figure 4B:
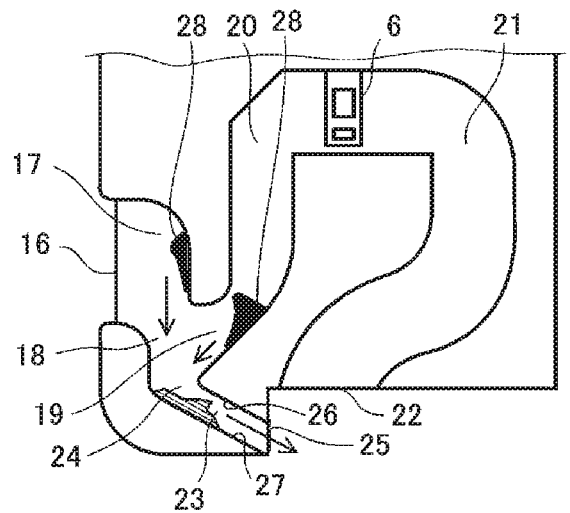
FIG. 4B is views for explaining a behavior of a foreign material which invades in the bypass passage of the flow measuring device according to Embodiment 1 of the present invention.

Therefore, an effect of a bypass passage according to Embodiment 1, by which the above-described problems can be solved, will be explained in the following description. In FIGS. 4A-4B, behaviors of a foreign material, which invades in the bypass passage in the flow measuring device according to Embodiment 1 of the present invention, are separated and indicated in FIG. 4A and FIG. 4B.

As indicated in FIG. 4A, the foreign material 28 and an inhalation air, which invade in the bypass passage, continue a linear motion along a flow direction 7a of the inhalation air by a similar way of the flow measuring device which is described in Patent Document 1, so that the foreign material 28 is smashed to an outer-circumference-side wall surface 17a of the first bending portion 17, an outer-circumference-side wall surface 18a of the second bending portion 18, and an outer-circumference-side wall surface 19a of the third bending portion 19. The foreign material 28, which is smashed to the bypass passage wall surface, is flowed along the bypass passage wall surface while time is elapsed, and is naturally fallen in an insertion direction which is indicated by an arrow 10. However, in this case, the outer-circumference-side wall surfaces (the outer-circumference-side wall surface 18a of the second bending portion 18 and the outer-circumference-side wall surface 19a of the third bending portion 19), which are positioned at adjacent portion of the sub-bypass passage 23, are inclined toward a direction of the sub-inflow opening 24, so that the foreign material 28 is guided to the sub-inflow opening 24.

Moreover, the inner-circumference-side wall surface 26 and the outer-circumference-side wall surface 27, which compose the sub-bypass passage 23, are inclined toward a direction of the sub-outflow opening 25, so that the foreign material 28 is flowed along the wall surface of the sub-bypass passage 23, and is ejected from the sub-outflow opening 25 to the outside of the flow passage.

Therefore, the foreign material 28 is stacked in the bypass passage, and a shape of the bypass passage is not varied in accordance with a stack of the foreign material 28, and an output variation, which is a problem in a conventional example and is caused in accordance with the stack of the foreign material 28, can be prevented.

Figure 5:
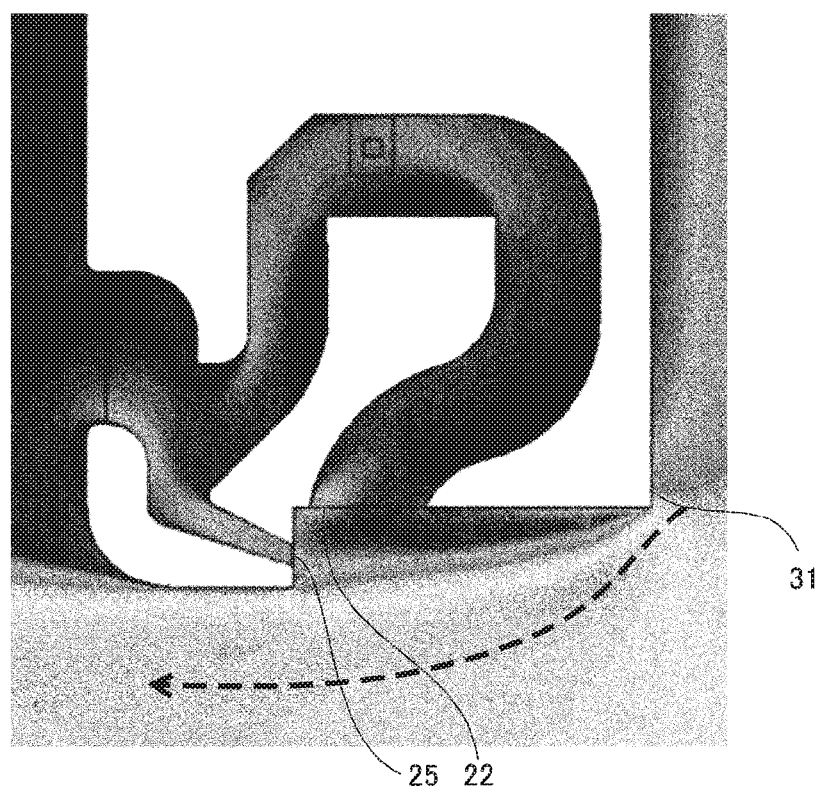
FIG. 5 is a flow velocity contour view when a back flow is caused at an adjacent portion of the flow measuring device according to Embodiment 1 of the present invention.

FIG. 5 is a flow velocity contour view of air at an adjacent portion of the flow measuring device, which is obtained by the CAE analysis when a back flow is caused, in the flow measuring device according to Embodiment 1 of the present invention. In FIG. 5, an area, which indicates a thin portion, indicates that a value of an air flow velocity is high.

It is recognized in reference to FIG. 5 that when a back flow is caused, an exfoliation of an air flow at the adjacent portion of the flow measuring device is caused at an end portion of a downstream-side outer circumferential wall surface 31 of the flow measuring device. In the flow measuring device according to Embodiment 1 of the present invention, the outflow opening 22 and the sub-outflow opening 25 are disposed at an adjacent portion of the end portion of the downstream-side outer circumferential wall surface 31, which composes the flow measuring device, with respect to an insertion direction, so that the flow measuring device has a configuration in which a back flow is not easily flowed in accordance with the exfoliation which is caused at the end portion of the downstream-side outer circumferential wall surface 31 which composes the flow measuring device (refer to a dashed arrow line). Therefore, an invasion probability, with respect to the bypass passage, of a foreign material which is flying and coming together with the back flow, can be reduced.

As described above, in the flow measuring device according to Embodiment 1, the foreign material, which invades in the bypass passage, can be effectively ejected to the outside of the bypass passage, and the flow measuring device, by which the above-described problem is solved, can be configured.

EMBODIMENT 2

In Embodiment 2, a configuration, by which an invasion capability for dust is more improved when a back flow is caused, in comparison with the above-described Embodiment 1, and detection accuracy of a flow measuring device is improved, will be explained.

Figure 6:
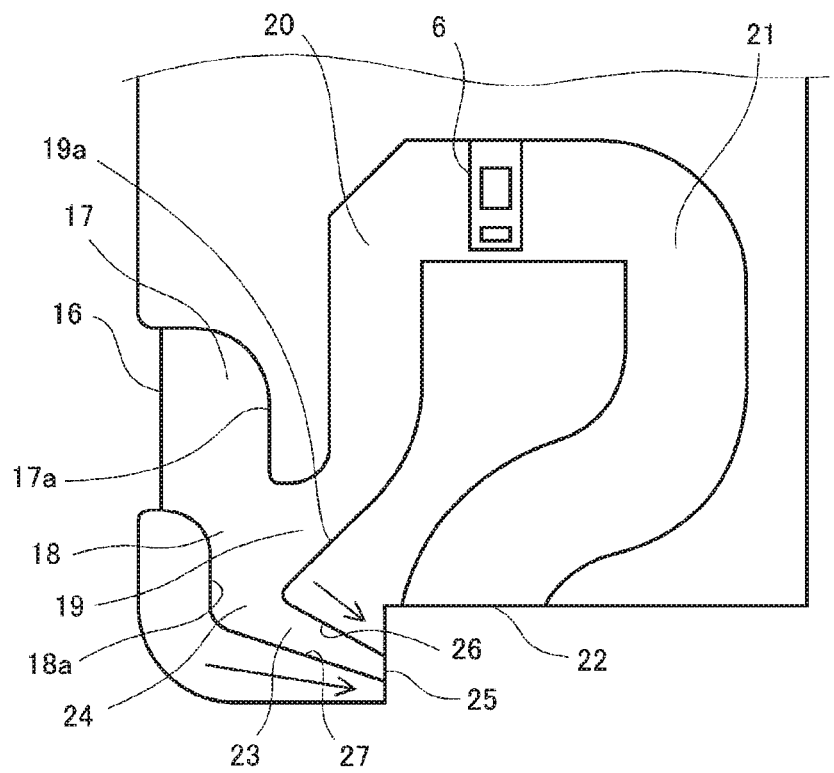
FIG. 6 is a front view in which adjacent portions of a bypass passage of a flow measuring device according to Embodiment 2 of the present invention are enlarged and indicated.

FIG. 6 is a front view in which adjacent portions of a bypass passage of a flow measuring device according to Embodiment 2 are enlarged.

In the flow measuring device according to Embodiment 2, the flow measuring device is configured in such a way that a passage cross-sectional area of the sub-bypass passage 23 according to Embodiment 1 is smoothly narrowed from a sub-inflow opening 24 to a sub-outflow opening 25. In other words, a passage cross-sectional area of the sub-outflow opening 25 is smaller than a passage cross-sectional area of the sub-inflow opening 24, and a passage cross-sectional area of a bypass passage 8 is smoothly narrowed from the sub-inflow opening 24 to the sub-outflow opening 25. In addition, the other configurations according to Embodiment 2 are similar to the configurations according to Embodiment 1, so that an explanation is omitted.

An aperture area of the sub-outflow opening 25 is decreased, whereby a pressure loss of a sub-bypass passage 23 is increased with respect to a back flow. Therefore, the back flow is not more easily flowed, in comparison with Embodiment 1, to the sub-bypass passage 23 when the back flow is caused, and an invasion capability of a foreign material toward the sub-bypass passage 23 can be reduced.

Moreover, a passage cross-sectional area of the sub-bypass passage 23 is narrowed, whereby a pressure loss is increased and a measured fluid, which is flowed to the sub-bypass passage 23, is not easily flowed, and a flow of the measured fluid, which is flowed to a main passage, is increased, whereby detection accuracy of the flow measuring device can be improved.

As described above, in the flow measuring device according to Embodiment 2, a shape of the sub-bypass passage 23 is improved, whereby the flow measuring device, by which a higher dust overload tolerance is maintained in comparison with the flow measuring device according to Embodiment 1, can be configured.

EMBODIMENT 3

In Embodiment 3, a configuration, by which an invasion capability for dust is more improved when a back is caused, in comparison with the above-described Embodiment 1, will be explained.

Figure 7:
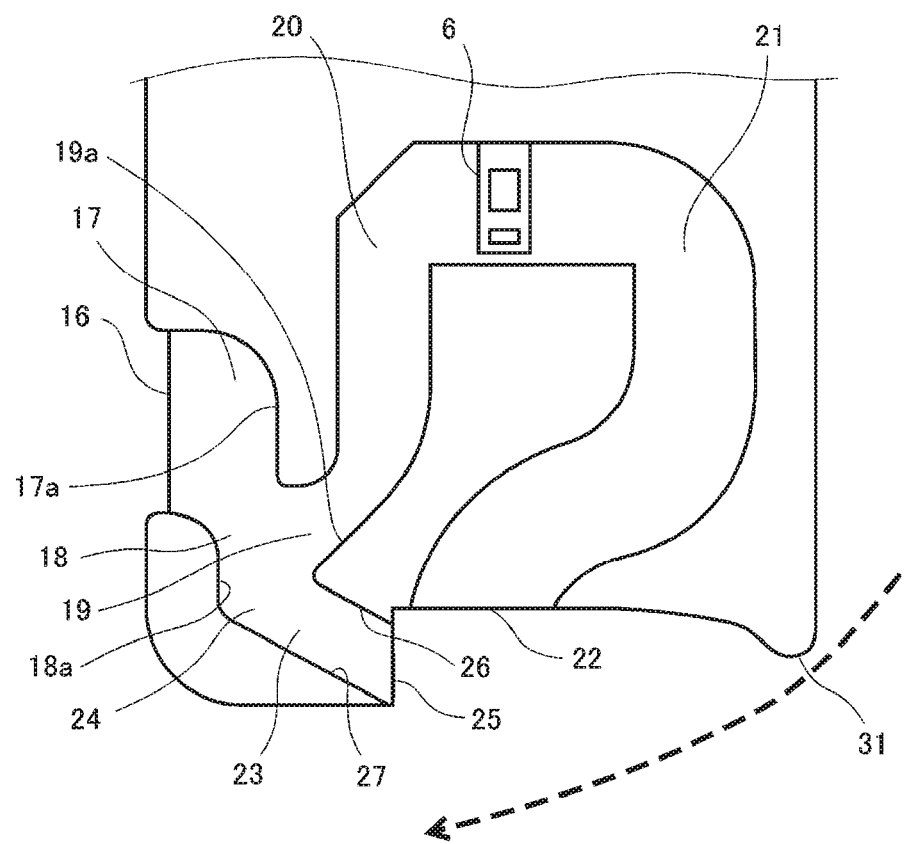
FIG. 7 is a front view in which adjacent portions of a bypass passage of a flow measuring device according to Embodiment 3 of the present invention are enlarged and indicated.

FIG. 7 is a front view in which adjacent portions of a bypass passage of a flow measuring device according to Embodiment 3 are enlarged.

In the flow measuring device according to Embodiment 3, the flow measuring device is configured in such a way that the downstream-side outer circumferential wall surface 31, which composes the measuring device according to Embodiment 1, is protruded toward an insertion direction in such a way that the downstream-side outer circumferential wall surface 31 covers on a projection area of a sub-outflow opening portion. In other words, an end portion of a downstream-side outer circumferential wall surface 31, which composes the measuring device according to Embodiment 3, is protruded in such a way that the end portion covers a sub-outflow opening 25 with respect to a back flow of a measured fluid which is flowed in a main passage. In addition, the other configurations according to Embodiment 3 are similar to the configurations according to Embodiment 1, so that an explanation is omitted.

The end portion of the downstream-side outer circumferential wall surface 31, which composes the measuring device, is protruded toward an insertion direction, which is indicated by an arrow 10, in such a way that the end portion covers on a projection area of the sub-outflow opening 25, and an exfoliation, which is caused at the downstream-side outer circumferential wall surface 31 when a back flow is caused, is located at a lower portion, and the back flow is not easily flowed to an outflow opening 22 and a sub-outflow opening 25 in comparison with the measuring device according to Embodiment 1, whereby an invasion probability, with respect to the bypass passage, of a foreign material 28, can be reduced.

As described above, in the flow measuring device according to Embodiment 3, a shape of the sub-bypass passage 23 is improved, whereby the flow measuring device, by which a higher dust overload tolerance is maintained in comparison with the flow measuring device according to Embodiment 1, can be configured.

In the present invention, in the scope of the present invention, it is possible that each of embodiments is freely combined, or each of embodiments is suitably modified or omitted.

What is claimed is:

1. A flow measuring device for measuring flow of a fluid circulating in a main passage, said device comprising:
   a bypass passage by which a part of said fluid is circulated;
   a flow detecting element which is arranged at the bypass passage; and
   a control circuit by which the flow detecting element is controlled; wherein
   the bypass passage includes an inflow opening which is faced upstream with respect to a flow direction of said fluid in said main passage and is opened at a surface which is orthogonal to the flow direction of the main passage, an outflow opening by which the fluid passed through the bypass passage is joined to the main passage, and a plurality of bending portions which are provided in order to bend the bypass passage between the inflow opening and the outflow opening; and the plurality of bending portions include a first bending portion by which said bypass passage connected to said inflow opening is bent in a direction away from the control circuit, a second bending portion by which the bypass passage is bent in such a way that the bypass passage downstream of the first bending portion becomes parallel to the flow direction of the main passage, a third bending portion by which the bypass passage downstream of the second bending portion is bent in a direction toward the control circuit in such a way that the bypass passage becomes vertical with respect to the flow direction of the main passage, a fourth bending portion by which the bypass passage downstream of said third bending portion is bent in such a way that the bypass passage becomes parallel to the flow direction of the main passage, and a fifth bending portion by which the bypass passage downstream of said fourth bending portion is bent in a direction away from the control circuit in such a way that the bypass passage becomes vertical with respect to the flow direction of the main passage; and the flow detecting element is provided between the fourth bending portion and the fifth bending portion; and a sub-inflow opening in which fluid passed through the first bending portion is received, and a sub-outflow opening by which the fluid passed through the sub-inflow opening is joined to the main passage, are provided, and a sub-bypass passage is provided between the sub-inflow opening and the sub-outflow opening and is inclined downwardly toward the main passage; and the sub-outflow opening and the outflow opening are coplanar in a plane parallel to the flow direction of the main passage and parallel to an insertion direction of the flow measuring device.

2. A flow measuring device as recited in claim 1, wherein a passage cross-sectional area of the bypass passage is gradually narrowed from the sub-inflow opening to the sub-outflow opening.

3. A flow measuring device as recited in claim 1, wherein an end portion of a downstream-side outer circumferential wall surface of the flow measuring device is protruded into the main flow passage at a position in said main flow passage downstream of said sub-outflow opening with respect to said flow direction such that the end portion prevents a back flow of the fluid from entering the sub-outflow opening.

4. A flow measuring device as recited in claim 1, wherein a wall of the bypass passage between the first bending portion and the second bending portion is perpendicular to the flow direction of the main passage.

5. A flow measuring device as recited in claim 1, wherein the outflow opening is positioned downstream from the sub-outflow opening in the flow direction of the main passage.

* * * * *